United States Patent

Fleming

[15] 3,644,222

[45] Feb. 22, 1972

[54] ABLATIVE EPOXY RESIN COMPOSITION AND METHOD OF PREPARATION

[72] Inventor: Gerald J. Fleming, Bowie, Md.

[73] Assignee: The United States of America as represented by the Secretary of the Navy

[22] Filed: Oct. 31, 1967

[21] Appl. No.: 679,560

[52] U.S. Cl. ..........................260/2 EA, 102/103, 102/105, 149/109, 260/47 EA, 260/59
[51] Int. Cl. ...................................................C08g 30/12
[58] Field of Search ..............................260/47, 59, 2, 346.6

[56] References Cited

UNITED STATES PATENTS

| | | | |
|---|---|---|---|
| 2,697,102 | 12/1954 | Olin | 260/346.6 |
| 2,863,852 | 12/1958 | Shepherd et al. | 260/47 |
| 2,967,843 | 1/1961 | Delmonte et al. | 260/37 |
| 2,978,435 | 4/1961 | Ernst | 260/47 |
| 3,177,175 | 4/1965 | Barry | 260/47 X |
| 3,218,288 | 11/1965 | Warburton | 260/47 X |

OTHER PUBLICATIONS

Barkova et al., Chem. Abstracts 64, 11400h, (1966).
Adams et al. " Organic Reactions" Vol. 4, pp. 1, 3, 5, 47– 53 article by Kloetzel, " Diels– Alder Reaction with Maleic Anhydride."

*Primary Examiner*—William M. Short
*Assistant Examiner*—E. Nielsen
*Attorney*—R. S. Sciascia and J. A. Cooke

[57] ABSTRACT

A method of decreasing the erosion rate and thermal conductivity of epoxy resins by the addition of bridged Diels-Alder anhydride adducts and the resulting ablative compositions.

8 Claims, No Drawings

ABLATIVE EPOXY RESIN COMPOSITION AND METHOD OF PREPARATION

BACKGROUND OF THE INVENTION

This invention relates generally to ablative compositions and the method of making them, and more particularly to the ablative composition of epoxy resin and bridged Diels-Alder anhydride adducts.

Ablative compositions have found increasing utility as heat shields for aerospace vehicles, as protective covering for nose cones on missiles, as rocket case liners in solid propellant rockets and in general, as heat barriers in industrial applications wherever shielding from high temperatures is desired.

Various ceramic materials as well as phenolic resins have been used as thermal insulating and ablative materials. It has long been recognized, however, that it would be desirable to substitute a lower density material in these compositions for use in aircraft or in other similar vehicles where weight is a consideration.

Many of these materials also have a relatively high char rate which renders the material highly conductive at elevated temperatures, thus making it an ineffectual heat insulator.

Another property which the ablative material should exhibit is a low erosion rate but the need for this usually has to be balanced with that for low thermal conductivity since both of these properties do not appear to be present in conventional ablative materials.

SUMMARY OF THE INVENTION

Accordingly, it is an object of the invention to provide an ablative material which exhibits a low erosion rate.

Another object of the invention is to provide an ablative material of low specific gravity.

Still another object of the invention is to supply an ablative composition which exhibits a low thermal conductivity.

One other object of the invention is to provide a method of preparation for the ablative material.

Another object of the invention is to supply a rocket which has improved ablative properties.

The above-identified and other objects are attained by curing an epoxide resin with a bridge Diels-Alder adduct and then casting the above composition into a nose cone.

DESCRIPTION OF THE PREFERRED EMBODIMENTS

Some of the epoxy resins to be considered within the scope of the invention are diglycidyl ether of bisphenol A, resorcinol diglycidyl ether (RDGE), vinylcyclohexene dioxide, 3,4-epoxy-6-methylcyclohexylmethyl-3,4-epoxy-6-methyl cyclohexane carboxylate, polyphenyl glycidyl ether, polyglycidyl ether of phenol-formaldehyde novolac, polyglycidyl ether of ortho-cresolformaldehyde novolac, tetraglycidyl ether of tetraphenyleneethane, polyglycidyl ether of polyhydroxyterphenyl (RDR-700), triglycidyl ether of diphenyl (DPTGE) and bis(2,3-epoxycyclopentyl) ether. However, the epoxy resins which seem to exhibit the best ablative properties are those which have a high degree of aromaticity and a low epoxide equivalent weight under 200. Both resorcinol diglycidyl ether (epoxy eq.wt. of 130) and triglycidyl ether of diphenyl (epoxy eq.wt. of 150) are some examples of these preferred resins. It was also found that good ablative properties depended on resin purity.

The bridged Diels-Alder adducts are formed generally by the reaction of a cyclic diene with maleic anhydride, a dienophile. The adducts which are found to exhibit good ablative properties include methyl-5-norbornene-2,3-dicarboxylic anhydride (NMA), 5-norbornene-2,3-dicarboxylic anhydride (NA), 7-oxa-bicyclo(2.2.1)hepta-5-ene-2,3-dicarboxylic anhydride (FMAA), 9,10-dihydro-9,10-ethano-anthracene-11,12-dicarboxylic anhydride (AMAA), 3,6-endo-cyclopropylene-Δ4-tetrahydrophthalic anhydride (CPTA), bicyclo(2.2.4)deca-5-ene-2,3-decarboxylic anhydride (BDDA) and bicyclo(2.2.2)octa-5-ene-2,3-dicarboxylic anhydride (BOCA).

There are several possible explanations for the improved behavior of the bridged adducts in comparison with non-bridged compounds such as tetrahydrophthalic anhydride (THPA) and diaminodiphenyl sulfone (DAPS). The bridged adducts were found on thermal decomposition to yield maleic anhydride intact in the resin backbone in the form of a diester, which in turn can undergo further cross-linking through its olefinic linkage via the free radicals and/or ions present during the decomposition of the main resin. Thus the thermal degradation of the ablative composition proceeds in a controlled manner due to the existence of competing reactions. A further advantage is that the decomposition of the adduct is usually endothermic which is desirable since the process can absorb some of the external heat it encounters. In fact, the diene which is split out during the decomposition can undergo further endothermic rupture and vaporization and ultimately escape through the char structure and provide transportational cooling.

The ablative compositions were discovered to exhibit even better properties when more than one adduct was included. This would result in a controlled pyrolysis where each component would be given a greater chance to fully degrade and form a more highly cross-linked system. Examples of some of the mixtures include NMA and FMAA, NMA and AMAA or NMA, AMAA and FMAA.

The curing time and temperature of the resin system may vary and is dependent upon the system's reactivity. However, with the exception of FMAA cured systems, the initial reaction occurs at 100° C. for several hours. In addition, amine catalysts such as N, N-benzyldimethylamine, α-methylbenzyl dimethylamine, dimethyl amino methyl phenol or tridimethyl amino methyl phenol may be used to expedite the cure when necessary.

The ablative compositions may also include fillers. Some of the conventional fillers which can be used are carbon or graphite cloth, Refrasil (a silica cloth), powdered silica, titanium oxide, magnesium hydroxide and powdered carbon or graphite.

To illustrate the manner in which the invention may be carried out, the following examples are given. It is to be understood, however, that these examples are for the purpose of illustration and the invention is not to be regarded as limited to any one of the specific conditions cited herein.

EXAMPLE I 100 parts of DPTGE, 57.4 parts of NMA and 44.0 parts of FMAA were mixed together for 2 hours at 65° C. in order to make a homogeneous and complete solution. Then 0.5 parts of a catalyst N,N-benzyldimethylamine (BDMA) and 38.2 parts of $S_iO_2$ (powder) is added to the mixture which is held at 65° C. for another 15 minutes before casting. The resultant gel is cured at 75° C. for 18 hours and then post cured at 90° C. for 6 hours.

EXAMPLE II 100 parts of DPTGE, 55.4 parts of NMA, 37.6 parts of FMAA and 7.8 parts of AMAA were mixed together for 3 hours at 75° C. in order to make a homogeneous solution. Then 0.5 parts of the catalyst BDMA was added and was mixed for 15 minutes at 75° C. The resulting mixture was then made into laminates. The cure schedule was the same as in Example I.

EXAMPLE III 100 parts of RDGE and 108 parts of FMAA were mixed together for 2½ hours at 85° C. The temperature was reduced to 75° C. and 0.5 parts of BDMA was added and mixed for 15 minutes. The cure schedule was the same as in Example I.

EXAMPLE IV 75 parts of RDGE, 50.6 parts of NMA and 47.2 parts of FMAA were mixed together for 2½ hours at 80° C. Then 0.35 parts of the catalyst BDMA and 34.6 parts of $S_iO_2$ (powder) are added and mixed for 15 minutes at 80° C. The cure schedule was the same as in Example I.

Several of the ablative compositions of the present invention were tested and compared with those containing non-bridged curing agents. The test technique, called "alpha-rod" testing, comprised forming the ablative compositions into a three-quarter-inch diameter test rod having a thermocouple embedded three-eighths of an inch behind the front face of the rod. An oxyacetylene torch was positioned to impinge its flame on the front face of the test specimen and the specimen was fed forward at a rate equal to its ablation rate to keep the distance between the front face and the torch constant. The thermocouple imbedded in the specimen measures the thermal conductivity as a function of the time required to reach a specified temperature. The heat flux encountered by the front face of the rod is usually set at 60 cal./cm.$^2$/sec. The ablative values reported herein are an average of at least three specimens.

All the samples include 20 percent silica as a filler. The values '200° and '1,000° C. indicate the time required for the sample to reach 200° and 1,000° C. respectively as indicated by the thermocouple.

TABLE I

| Curing Agent | Resin-RDGE Char Rate Mils/sec. | '200°C. | '1000°C. |
| --- | --- | --- | --- |
| DAPS | 16.8 | 33.4 | — |
| THPA | 11.2 | 55 | 57 |
| NMA | 3.7 | 100 | 120 |
| BOCA | 3.2 | 103 | 142 |
| NA | 3.0 | 106 | 125 |
| NMA+FMAA | 1.3 | 131 | 190 |
| NMA+FMAA+AMAA | 2.6 | 92 | 132 |

TABLE II

| Curing Agent | Resin-DPTGE Char Rate Mils/sec. | '200°C. | '1000°C. |
| --- | --- | --- | --- |
| NMA | 2.7 | 106 | 186 |
| NMA+AMAA | 1.4 | 106 | 192 |
| NMA+FMAA | 2.0 | 126 | 218 |

TABLE III

| Curing Agent | Resin-RDR-700 Char Rate Mils/sec. | '200°C. | '1000°C. |
| --- | --- | --- | --- |
| DAPS | 16.7 | 33 | — |
| NMA | 5 | 91 | 111 |
| NMA+AMAA | 3.1 | 91.2 | — |

It can be seen from the test results that the ablative compositions which utilize at least one bridged Diels-Alder adduct exhibit low char rates and long times ('200° C., '1000° C.), thus providing a satisfactory high-temperature insulating material. In addition, the tests show that compositions containing the bridged adducts yield better ablative properties than those with conventional nonbridged curing agents.

While only a limited number of embodiments of the ablative composition of the present invention have been disclosed, it is still possible to provide other embodiments without departing from the inventive concept herein disclosed. It is therefore to be understood that the invention is limited only by the scope of the appended claims.

What is new and desired to be secured by Letters Patent of the United States is:

1. An ablative composition comprising a cured admixture of epoxy resin and 7-oxa-bicyclo(2.2.1)hepta-5-ene-2,3-dicarboxylic anhydride.

2. An ablative composition comprising a cured admixture of epoxy resin, 7-oxa-bicyclo(2.2.1)hepta-5-ene-2,3-dicarboxylic anhydride and an additional adduct selected from the group consisting of methyl-5-norbornene-2,3-dicarboxylic anhydride, 5-norbornene-2,3-dicarboxylic anhydride, 9,10-dihydro-9,10-ethanoanthracene-11,12-dicarboxylic anhydride, 3,6-endocyclopropylene-Δ4-tetrahydrophthalic anhydride, bicyclo(2.2.4)deca-5-ene-2,3-dicarboxylic anhydride, bicyclo(2.2.2)octa-5-ene-2,3-dicarboxylic anhydride and mixtures thereof.

3. An ablative composition according to claim 1 wherein said epoxy resin is selected from the group consisting of diglycidyl ether of bisphenol A, resorcinol diglycidyl ether, vinylcyclohexane dioxide, 3,4-epoxy-6-methylcyclohexylmethyl-3,4-epoxy-6-methyl cyclohexane carboxylate, polyphenyl glycidyl ether, polyglycidyl ether of phenol-formaldehyde novolac, polyglycidyl ether of ortho-cresolformaldehyde novolac, tetraglycidyl ether of tetraphenyleneethane, polyglycidyl ether of polyhydroxyterphenyl, triglycidyl ether or diphenyl and bis(2,3-epoxy-cyclopentyl) ether.

4. An ablative composition according to claim 2 wherein said epoxy resin is selected from the group consisting of diglycidyl ether of bisphenol A, resorcinol diglycidyl ether, vinylcyclohexene dioxide, 3,4-epoxy-6-methylcyclohexylmethyl-3,4-epoxy-6-methyl cyclohexane carboxylate, polyphenyl glycidyl ether, polyglycidyl ether of phenol-formaldehyde novolac, polyglycidyl ether of ortho-cresolformaldehyde novolac, tetraglycidyl ether of tetraphenyleneethane, polyglycidyl ether of polyhydroxytetraphenyl, triglycidyl ether of diphenyl and bis(2,3-epoxycyclopentyl) ether.

5. An ablative composition according to claim 4 comprising triglycidyl ether of diphenyl, methyl-5-norbornene-2,3dicarboxyylic anhydride and 7-oxa-bicyclo(2.2.1)hepta-5-ene-2,3-dicarboxylic anhydride.

6. An ablative composition according to claim 4 comprising triglycidyl ether of diphenyl, methyl-5-norbornene-2,3-dicarboxylic anhydride, 7-oxa-bicyclo(2.2.1)hepta-5-ene-2,3-dicarboxylic anhydride and 9,10-dihydro-9,10-ethanoanthracene-11,12 -dicarboxylic anhydride.

7. An ablative composition according to claim 3 comprising resorcinol diglycidyl ether and 7-oxa-bicyclo(2.2.1)hepta-5-ene-2,3-dicarboxylic anhydride.

8. An ablative composition according to claim 4 comprising resorcinol diglycidyl ether, methyl-5-norbornene-2,3-dicarboxylic anhydride and 7-oxa-bicyclo(2.2.1)hepta-5-ene-2,3-dicarboxylic anhydride.

\* \* \* \* \*